United States Patent
Welsh et al.

[15] 3,670,478
[45] June 20, 1972

[54] SELF-CLEANING AIR FILTER

[72] Inventors: Clarke T. Welsh; Billy M. Brumett, both of 611 Erie Ave., Logansport, Ind. 46947

[22] Filed: June 24, 1970

[21] Appl. No.: 56,043

Related U.S. Application Data

[63] Continuation of Ser. No. 713,108, March 14, 1968, abandoned.

[52] U.S. Cl. ................................................55/242, 261/90
[51] Int. Cl. .......................................................B01d 29/02
[58] Field of Search ....................55/220, 233, 234, 241-243, 55/290, 351, 400, 498; 261/89, 90, 92

[56] References Cited

UNITED STATES PATENTS

| 399,984 | 3/1889 | Gessl | 55/290 |
|---|---|---|---|
| 1,302,281 | 4/1919 | Bates, Jr. | 261/92 |
| 2,797,768 | 7/1957 | Bunker | 261/20 |
| 3,071,936 | 1/1963 | Irwin | 55/351 X |
| 3,127,256 | 3/1964 | Boylan | 55/351 X |
| 3,252,691 | 5/1966 | Getzin et al. | 261/80 |
| 3,395,901 | 8/1968 | Moser | 55/233 X |
| 3,505,794 | 4/1970 | Nutten et al. | 55/495 |

Primary Examiner—Tim R. Miles
Assistant Examiner—Steven H. Markowitz
Attorney—Woodard, Weikart, Emhardt & Naughton

[57] ABSTRACT

An air duct section with a cylindrical drum of washable filter material therein cradled on rollers and rotatable by a drive motor, but normally at rest. Upper and lower seal brushes are mounted to the duct and engage the drum, and water spray nozzles are provided inside and outside the drum, with timer controls on the motor and supply to the spray nozzles for rotating and spraying the drum at selected intervals, to wash accumulated deposits from the filter to a drain.

7 Claims, 4 Drawing Figures

PATENTED JUN 20 1972 3,670,478

INVENTORS
CLARKE T. WELSH
BILLY M. BRUMETT
BY
Woodard, Weikart, Emhardt & Naughton
Attorneys

3,670,478

SELF-CLEANING AIR FILTER

CROSS REFERENCE TO RELATED APPLICATIONS

This application is a continuation of our original application, Ser. No. 713,108, filed Mar. 14, 1968, now abandoned.

BACKGROUND OF THE INVENTION

1. Field of the Invention

This invention relates generally to air filters and more particularly to a filter which is automatically cleaned at predetermined times.

2. Description of the Prior Art

Varieties of filters are known in the art and some devices more or less related to the general field of the invention are shown and described in United States pats. as follows:

Scharmer 2,886,124
Lunde 2,889,007
Yerzley 3,121,618
Hill, Jr. 3,221,635

There has remained a need for a filter of high efficiency but which is of reasonable size and cost, and wherein a high average efficiency can be retained over a long period of use.

OBJECTS

It is an object of this invention to provide an air-filtering apparatus for an air-conditioning system, which is simple in construction, efficient in operation, durable in use and relatively small in size.

Another object is to provide an air-filtering apparatus of relatively small size but which nevertheless provides the necessary air flow and filtering action for the usual air-conditioning systems.

SUMMARY

Described briefly, in a typical embodiment of the present invention, a drum of filter material is provided in a duct and sealed thereto, the drum being rotatable at predetermined hours by a timer. Filter washer means are provided for activation by the timer when the drum is rotated thereby, to wash accumulated foreign matter from the filter to a drain.

DESCRIPTION OF THE PREFERRED EMBODIMENT

Figure 3:
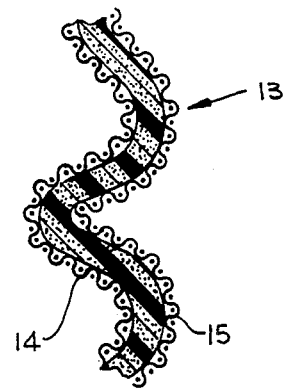
FIG. 3 is an enlarged fragmentary cross section through the filter material taken on a plane perpendicular to the rotational axis of the filter drum.

The air filter of the present invention is particularly well suited to employment in the return air duct of an air-conditioning system for cooling,. For such an installation, and referring to the drawings, there is shown a portion of duct 11 within which is mounted a rotatable drum 12. The drum 12 is formed from a combination of framework and sections of filter structure 13 (better shown in FIG. 3) having a corrugated aluminum or expanded metal sheet 14 on both sides as a base with a plastic foam material 15 between the corrugated aluminum, or adhered to a perforator material. The corrugations are oriented longitudinally parallel to the cylindrical axis of the drum. If aluminum sheet is employed, it is perforated by many small holes that permit air to flow freely to and through the foam, while permitting the sheet itself to provide the mechanical support for the foam. In addition to perforated aluminum, other base materials might be employed including the well known varieties of "expanded metal", Smith et al., U.S. Pat. No. 3,125,427, for example. The drum type of filter construction gives a two-pass or dual filtering effect, because gas flowing in one direction through the duct passes through the filter material twice.

Smooth metal bands 18 are located near the opposite ends of the drum 12 and rest on two pairs of support rollers or wheels 19 to cradle or support the drum 12 so that it may rotate in place about its cylindrical axis.

Figure 1:
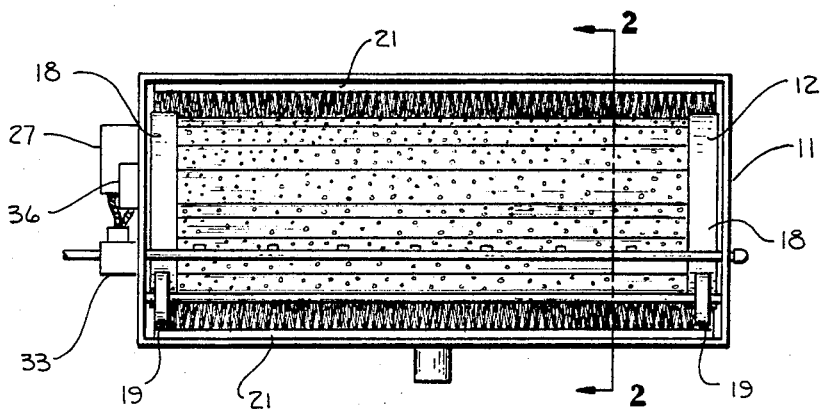
FIG. 1 is a front elevational view showing a typical embodiment of the present invention.
Figure 2:
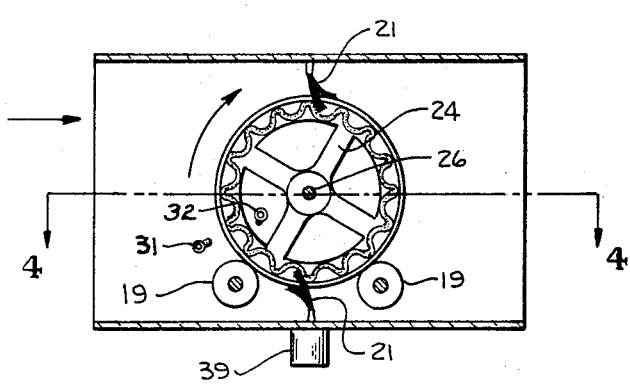
FIG. 2 is a vertical section taken at line 2—2 in FIG. 1 and viewed in the direction of the arrows.

The outside diameter of the drum 12 is less than the height of the duct section 11 thereby providing a clearance therewith as shown in FIG. 2. In order to provide an adequate seal and thereby assure that most of the air passing through the duct section 11 will pass through the filter material of the drum rather than around the drum, two densely bristled nylon brushes 21 in engagement with the drum periphery are mounted one in the top and the other in the bottom of the duct section 11 thereby closing the clearance opening between the drum periphery and the duct. Possibly brushes may be used on the sides of the drum for air flow control. These brushes extend the full length of the drum and provide an effective air seal between the drum and the top and the bottom of the duct section. Quite obviously, rotation of the drum 12 will result in rubbing or brushing engagement of the surface thereof by the brushes 21.

A spoke arrangement 24 is provided at one end of the drum for connection thereof to a drive shaft 26, the other end of the shaft being driven by a suitable electric drive motor 27, when the motor is energized.

Figure 4:
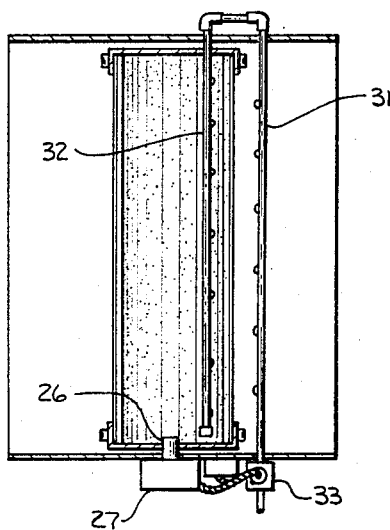
FIG. 4 is a horizontal section through the assembly taken at line 4—4 in FIG. 2 and viewed in the direction of the arrows.

A water pipe 31 is provided across the duct on the upstream side of the drum and has a plurality of holes or nozzles spaced therealong for spraying the drum surface with water supplied to the pipe. A second pipe 32 is provided inside the drum and extends the length thereof and has a plurality of holes or nozzles spaced therealong for spraying the interior surface of the drum. Pipes 31 and 32 are connected together as shown in FIG. 4 and the connecting piece may be covered by a suitable piece of sheet metal secured to the side of the duct if desired for esthetic purposes.

A solenoid operated valve 33 is normally closed and prevents entry of water to the pipes 31 and 32. However a timer 36 is provided and is connected to the drum drive motor and to the solenoid valve for simultaneous energization of both.

In operation, the drum is normally at rest as the air flows through the duct during normal operation of the air conditioning system. During this period the filter material will naturally accumulate deposits from the air passing therethrough. At suitable times determined by setting the timer, it will energize the motor and solenoid valve. The setting is normally made for approximately 5 minutes of motor operation and solenoid energization during each 24 hours. During this 5 minutes, the motor drive 27 rotates the drum 12 at approximately one revolution per minute while hot water, preferably at 160° F. or hotter, is sprayed through the nozzles on the pipes 31 and 32. This hot water effectively rinses the trapped dust, oil and grease from the filter drum to the bottom of the duct section, and it drains from there through the pipe 39 to any suitable receptacle or sewer.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. Air-filtering apparatus in combination with a return air duct of an air-conditioning system for cooling, said return air duct having inlet and outlet ends, a normally stationary cylindrically shaped filter transversely mounted in and substantially filling said duct for rotation about its axis whereby air flow between said inlet and outlet ends passes through the circumferential extent of said filter, means for restricting air flow past the periphery of said filter, means for washing said filter, means for rotating said filter, and means for activating simultaneously and periodically said washing and rotating means for a limited period of time whereby said filter is rotated only during washing and is otherwise stationary, said restricting means including a flexible sealing device extending inwardly from a wall of and being secured to said return air duct and having rubbing engagement with a periphery of said filter adjacent to said wall whereby particles collected by said filter may be dislodged during the aforesaid washing, said filter including a cylindrically shaped filter medium pervious to the flow of air whereby air flowing through said duct will pass diametrically through said filter.

2. The apparatus of claim 1 in which said cylindrically shaped filter medium is of sheet-like material formed with portions extending radially of said cylindrical filter thereby providing additional surface area for filtering as compared with a smooth cylindrical shape for said sheet-like material.

3. The apparatus of claim 2 in which said radial portions of said filter medium are corrugations composed of ridges and furrows which are elongated and parallel to the axis of said cylindrical filter.

4. The apparatus of claim 3 in which said filter medium includes a plastic foam material sandwiched between two coaxial perforate metallic sheets.

5. The apparatus of claim 2 in which said restricting means includes two elongated brush devices extending in a direction from one end of said filter to the other, said brushes being mounted on said duct on diametrically opposite sides, respectively, of said filter and having rubbing engagement with said filter when the latter is rotated.

6. The apparatus of claim 5 in which said washing means includes water spray devices disposed internally and externally of said filter and a solenoid operated valve for controlling water flow thereto, said rotating means includes an electric motor, and said activating means includes a timing mechanism electrically connected to said motor and said solenoid and including means for activating and deactivating periodically said electric motor and solenoid.

7. The apparatus of claim 6 wherein said filter is rotatably supported in said duct by means of a series of spaced rollers journalled for rotation about axes parallel to said filter axis, said filter being supported on and between said rollers, one end of said filter being open, a stationary pipe disposed internally of said filter and extending outwardly of said open end for connection to said solenoid operated valve, said pipe carrying said internal spray devices.

* * * * *